United States Patent [19]
Heinonen et al.

[11] Patent Number: 5,887,266
[45] Date of Patent: Mar. 23, 1999

[54] METHOD FOR USING APPLICATIONS IN A MOBILE STATION, A MOBILE STATION AND A SYSTEM FOR EFFECTING PAYMENTS

[75] Inventors: Petri Heinonen; Mikko Terho, both of Tampere; Matti J. Marttila, Hämeenlinna; Markku Rautiola, Tampere, all of Finland

[73] Assignee: Nokia Mobile Phones Limited, Salo, Finland

[21] Appl. No.: 597,845

[22] Filed: Feb. 7, 1996

[30]    Foreign Application Priority Data

Feb. 15, 1995  [FI]  Finland ................................. 950685

[51] Int. Cl.⁶ ................................................ H04Q 7/32
[52] U.S. Cl. ........................... 455/558; 455/406; 455/407
[58] Field of Search ............................ 455/406, 407, 455/558, 557, 403, 409, 575, 419; 379/91.03, 357, 56.3, 144; 235/380

[56]             References Cited

U.S. PATENT DOCUMENTS

| | | | |
|---|---|---|---|
| 4,965,821 | 10/1990 | Bishop et al. | 379/91 |
| 5,068,891 | 11/1991 | Marshall | 379/91 |
| 5,127,040 | 6/1992 | D'Avello et al. | 455/409 |
| 5,134,717 | 7/1992 | Sogaard Rasmussen | 455/89 |
| 5,138,650 | 8/1992 | Stahl et al. | 379/61 |
| 5,144,649 | 9/1992 | Zicker et al. | 379/59 |
| 5,175,759 | 12/1992 | Metroka et al. | 455/566 |
| 5,223,699 | 6/1993 | Flynn et al. | 379/144 |
| 5,266,782 | 11/1993 | Alanara et al. | 235/380 |
| 5,272,747 | 12/1993 | Meads | 379/59 |
| 5,315,638 | 5/1994 | Mukari | 379/58 |
| 5,335,276 | 8/1994 | Thompson et al. | 455/558 |
| 5,353,328 | 10/1994 | Jokimies | 379/58 |
| 5,359,182 | 10/1994 | Schilling | 235/380 |
| 5,448,622 | 9/1995 | Huttunen | 379/58 |
| 5,487,084 | 1/1996 | Lindholm | 375/215 |
| 5,497,411 | 3/1996 | Pellerin | 455/558 |
| 5,506,893 | 4/1996 | Buscher et al. | 379/144 |
| 5,550,897 | 8/1996 | Seiderman | 455/558 |
| 5,574,775 | 11/1996 | Miller, II et al. | 455/444 |
| 5,577,100 | 11/1996 | McGregor et al. | 455/406 |
| 5,583,918 | 12/1996 | Nakagawa | 379/144 |
| 5,586,166 | 12/1996 | Turban | 455/558 |
| 5,604,787 | 2/1997 | Kotzin et al. | 379/357 |
| 5,625,669 | 4/1997 | McGregor et al. | 379/91.01 |
| 5,719,918 | 2/1998 | Serbetciouglu | 455/466 |
| 5,724,655 | 3/1998 | Grube et al. | 455/419 |
| 5,754,655 | 5/1998 | Hughes et al. | 235/380 |

FOREIGN PATENT DOCUMENTS

WO 94/11849   5/1994   WIPO .

OTHER PUBLICATIONS

"Proposal for Standard AT Commands Used with GSM Mobile Equipment", P. Heinonen, Nov. 16, 1994, 89 pages.
Document ETSI STC SMG 9, doc (94) 74, 4 pages. dated Aug. 1994.

*Primary Examiner*—Dwayne D. Bost
*Assistant Examiner*—Jean Gelin
*Attorney, Agent, or Firm*—Perman & Green, LLP

[57]              ABSTRACT

A method is provided for using an application (18) in a mobile station (1). The application has a first mode of operation and a second mode of operation. The first mode of operation is passive. In the second mode of operation the application (18) controls a master control unit (MCU) of the mobile station (1). Also provided is a system for making payments, comprising at least one mobile station (1) which has an associated application (18), a component for using the application (18), and a first transceiver (IR, 20, RF) for providing local data transfer. The system also comprises at least one cash register (21) or the like, which has a second transceiver for providing data transfer (IR2). The application (18) has a capability for causing data to be transferred from the first transceiver (IR) to the second transceiver (IR2).

50 Claims, 10 Drawing Sheets

METHOD FOR USING APPLICATIONS IN A MOBILE STATION, A MOBILE STATION AND A SYSTEM FOR EFFECTING PAYMENTS

BACKGROUND OF THE INVENTION

The invention relates to a method for using applications in a mobile station, a mobile station (also called a mobile radio communication unit), and a system for effecting payments.

There are prior art mobile phones in which the control card includes a subscriber identification unit, such as the SIM (Subscriber Identity Module) used in GSM (Global System for Mobile Communications) standard based systems. The SIM comprises a control unit CPU (Central Processing Unit), program memory ROM (Read Only Memory), data memory suited for long-term storage EEPROM (Electrically Erasable Programmable Read Only Memory) and operation memory suited for saving data during use RAM (Random Access Memory). For using the mobile phone, a PIN (Personal Identification Number) number saved on the SIM must be given, generally when the mobile phone is switched on. Other user-specific information, such as telephone numbers, messages, etc. can also be saved in the data memory of the SIM.

There are now also mobile phones which have a data connector for connecting an external data processing unit, such as a portable computer. Thus the mobile phone can be used as a means for data transfer between the portable computer and some other data processing equipment through a radio communication network. In this way it is possible to establish a connection e.g. to the user's bank for checking the balance and effecting payments. However, an arrangement of this kind is not very practical, because a separate cable is needed between the computer and the mobile phone. In addition, the computer must be available for establishing e.g. a bank connection.

Wireless systems, so called smart cards or payment cards, are also known, the said cards being mostly used in payment applications, such as making payments in buses and public telephones. Smart cards like this generally include a central processing unit, a program memory and a data memory. The internal operation of the card in use is controlled by the CPU in accordance with the program code stored in the program memory. The data memory is used for saving information relating to the intended use of the smart card, such as its value in money. For performing the payment transaction, the card also contains means for data transfer, such as a transmitter/receiver based on electromagnetic induction. A disadvantage of smart cards of this kind is, e.g., the fact that several different cards may be needed for different kinds of payment, and so the user must carry a large number of cards. In addition, when the amount of money loaded in the card has been consumed, one needs to buy a new card or load a new amount of money in the card at a sales outlet offering a loading service.

The Japanese patent application JP 4 083 447 presents a mobile phone to which it is possible to add more properties by means of a separate memory card. An application like this is preferably arranged for a certain use, such as for increasing the saving capacity or the telephone number memory. Applications like this are based on a method in which the central processing unit of the mobile phone reads the data saved in the applications (memory cards) and operates in a predetermined way required by the data. A disadvantage of this method is the fact that the functions needed for performing different operations of the applications must be programmed to the central processing unit CPU in advance, whereby the development of new applications also requires changes in the programs of the central processing unit.

The international patent application WO 91/12698 presents a mobile phone to which it is possible to add properties by means of a separate add-in card, such as a smart card. In this way it is possible to restrict the use of the phone by preventing foreign calls, long-distance calls or calls to service numbers, for example. The information about call restrictions is saved on an add-in card which the user has to install in the mobile phone when it is being used. Thus the main use of this method is to prevent the use of some properties of the mobile phone.

SUMMARY OF THE INVENTION

In order to eliminate the aforementioned disadvantages and to raise the standard of technology in this field, a new method for using applications in a mobile radio communication unit (mobile station) has been invented, as well as a new mobile station and a new system for effecting payments. The application is preferably arranged for a certain use, such as a credit card, a cash card or a payment card. The application can also offer special services, like time tables for public transportation or exchange rates. The application is preferably implemented in an application module, the technical solutions of which can be close to those of the above mentioned SIM. The same application module can contain more than one application. The application module is attached to a module card of a certain size, generally formed of plastic or corresponding material, in such a way that the application module has an application connector for leading the required conductors from the mobile station to the application module. The same module card can include several application modules, whereby each application module has its own application module connector. The application module connectors are functionally connected with the application module connectors of corresponding module cards. Each module card is connected to a module card connector arranged in the mobile station, in which arrangement the said module card connector also includes an application module connector.

The invention is based on the idea that the mobile station can be complemented with applications which have a first mode of operation and a second mode of operation. An application in the first mode of operation does not do anything actively, but stays in the background, passive. In the second mode of operation, the application is active and can, e.g., control the central processing unit of the mobile station. When in the second mode of operation, the application can also use peripheral equipment which are generally known components of a mobile phone, such as a display, keypad, status indicators and data ports, which the application has requested when switching to the second mode of operation.

Applications used in the method of the invention can preferably be of three different types, depending on the situation in which the application can switch to the second mode of operation: 1) The so-called power-up type, hereby the application switches to the second mode of operation as soon as possible after the mobile station is switched on and/or the module card is inserted, 2) The menu type, in which the user can select the application he wants to be active, e.g. from a menu shown on the display of the mobile station, and 3) Automatic type, in which the application switches to a second mode of operation when a certain condition, defined for the application, has been satisfied. For example, an application of the third operation mode can become active in the GSM system, when the mobile station receives a specific SMS (Short Message Services) message. SMS messages are typically used to transfer short text messages between mobile stations. The automatic type can also be selected from a menu. A menu option can also be used in a situation in which several power-up type applications have been connected to the mobile station, and one of the said applications can switch to the second mode of operation.

The method of the invention is characterized in that the application has a first mode of operation and a second mode of operation, whereby the application is passive in the first mode of operation, and in the second mode of operation the application controls the central unit of the mobile station.

The mobile station in accordance with the invention is characterized in that it also comprises means for setting the application in a first mode of operation, in which the application is passive,
means for setting the application in a second mode of operation, in which the application is active, and
means for controlling the central unit of the mobile station when the application is in the said second mode of operation.

Remarkable advantages are achieved by this invention compared to the prior art solutions. By means of this invention, the range of possible uses for a mobile phone can be substantially increased. Besides the normal phone and data services, the mobile stations related to the invention can also be used e.g. as a credit card and/or as a cash card, instead of traditional plastic cards. By means of a mobile station equipped with a suitable application module the user can make payments in a shop using his/her credit account (credit card application) or pay directly from his/her bank account (cash card application), and thus no real cash is needed.

Typical for both credit card and cash card type of applications is that money, in electric form, is stored in a central computer (also referred as a money server), which the mobile station contacts when making a payment. The money server is typically located in a bank's premises. If wanted, it is possible for the application to check the credit limit or the balance of the bank account before the payment is accepted.

It is also possible to store money to an "electric money purse" in the mobile station or in the application module itself. In that case it preferably is not necessary to check the credit limit or balance of the bank account from the money server before the payment can be accepted, i.e. it is not necessary to contact the money server for making a payment. The information of how much money there is stored in the "electric money purse" can be read from the memory of the mobile station or the application module, from which electric money is subtracted when a payment is made. These kind of applications, where the money is stored in the mobile station or in the application module itself, are also referred as payment applications.

DETAILED DESCRIPTION

Figure 1:
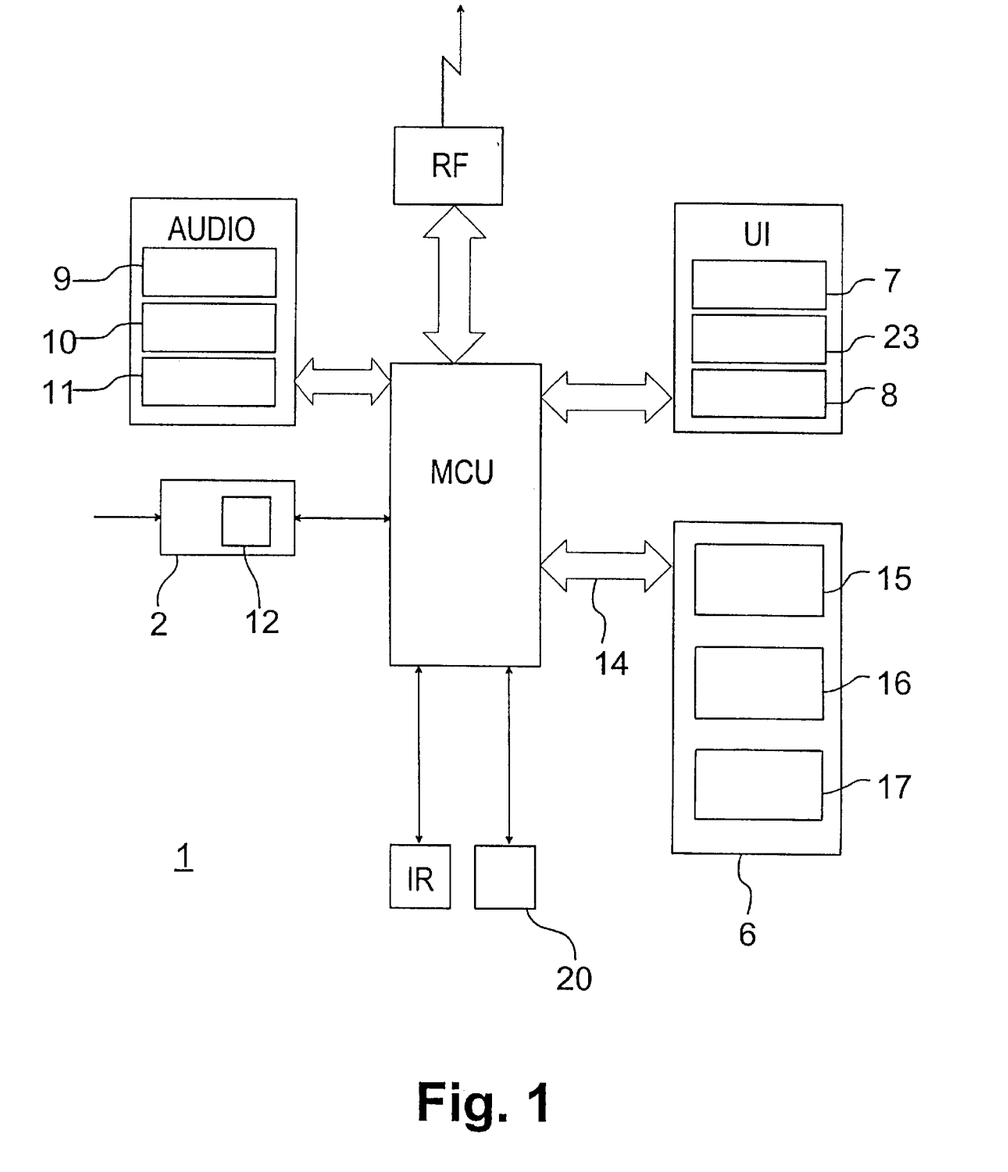
FIG. 1 shows a block diagram of a mobile station in accordance with the invention.

In the exemplary embodiment of the invention, shown in FIG. 1, a card-controlled mobile station 1 comprises a master control unit MCU, a user interface UI, a high-frequency part RF, a low-frequency part AUDIO, a power unit 2, a first means for data transfer IR, and an application module connection unit 6. The operation of the mobile station 1 is controlled by the MCU, which has a program code stored in advance for performing different operations.

The user interface UI comprises components which are known from prior art mobile phones, namely a display 7, a keypad 8 and status indicators 23. The MCU produces various, situation-specific messages, operation instructions, menus etc. on the display 7. Using the keypad 8, the user can enter different kind of information to the mobile station 1, such as the identification number and telephone number, and select operations from the menus. The status indicators 23 can preferably be used to indicate the internal modes of operation of the mobile station 1.

The radio frequency component RF is a known component of mobile phones, which is used to transmit and receive calls and messages using radio frequencies in a radio communication network, such as a GSM network, e.g. through a mobile services switching center, MSC.

The low-frequency part AUDIO preferably comprises a microphone 9, a head-phone 10 and a buzzer 11 or the like.

The operation power for the mobile station 1 is supplied by a battery 12, which is charged when required. The power unit 2 monitors the charge status and charging procedure of the battery 12, among other things. The power unit 2 sends the information to the central unit MCU when the charge status of the battery 12 falls below a predetermined value, whereby the MCU announces this preferably by sounding the buzzer 11 and/or showing a message on the display 7.

Figure 3A:
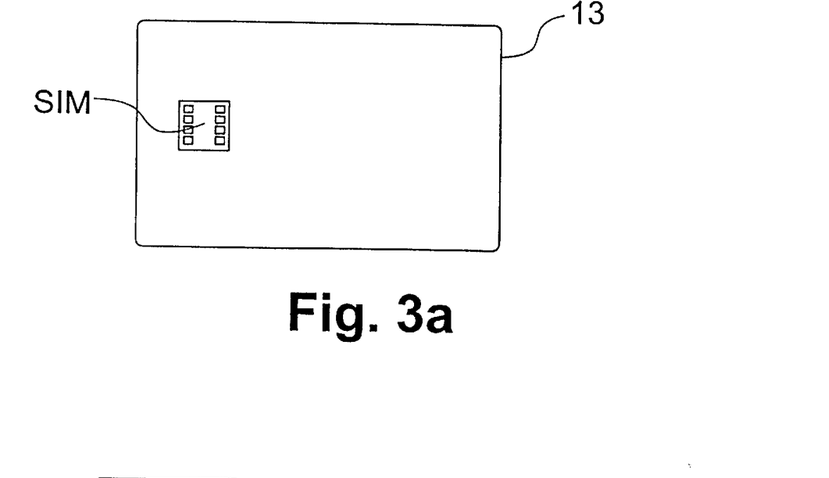
FIG. 3a shows a control card of a mobile phone.

A module card 13, like the one shown in FIG. 3a, is connected to the module card connector (not shown) located in the mobile station 1. The module card 13 can contain, among other things, a subscriber identity module (SIM) for user identification.

Application module connectors have been arranged in the application modules 19 in the module card 13.

Figure 2:
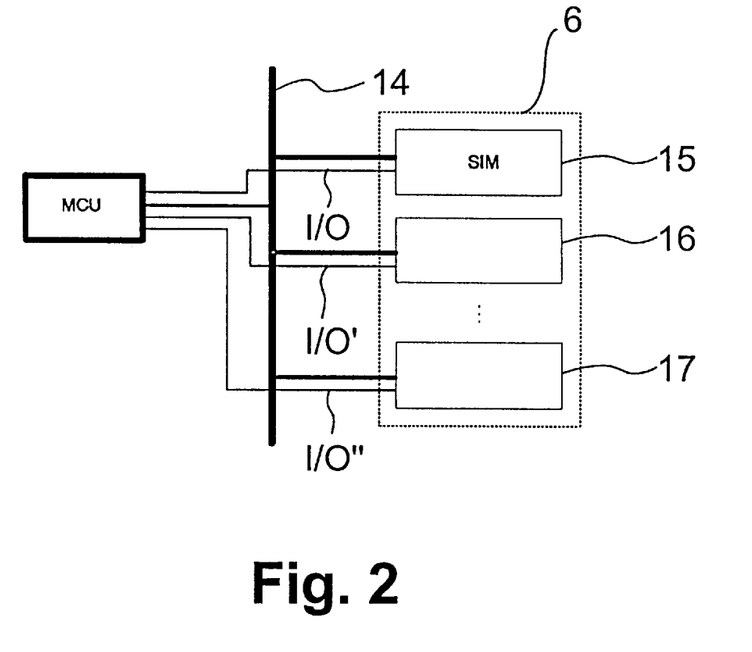
FIG. 2 shows the electric construction of an application module bus between the application module connection unit and CPU of a mobile station in accordance with the invention.
Figure 3B:
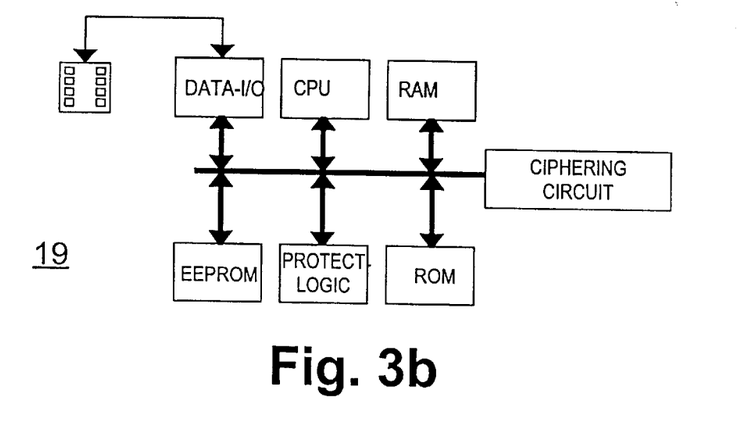
FIG. 3b shows the internal structure of the control card of the mobile phone shown in FIG. 3a as a block diagram.

FIG. 3b shows the internal structure of the SIM as a simplified flowchart. The central processing unit CPU controls the operation of the SIM on the basis of the program code stored in the program memory. Various user-specific information can be saved in the data memory EEPROM, and this information stays in the memory even if the control card SIM is removed from the application module connection unit 6. The application module connection unit 6 is located in the mobile station 1 as shown in FIGS. 1 and 2. During the operation of the control card, the operation memory RAM (FIG. 3b) can be used as a temporary data storage. The bus adapter DATA-I/O fits the SIM card to the application module bus 14 and to the control and data line I/O (FIG. 2).

Other module cards 13 can also be connected to the application module connection unit 6 of the exemplary embodiment in FIG. 1, whereby they are preferably connected to their own module card connectors. The application module 19 (FIG. 3c) on the module card 13 can have a similar mechanic and electric construction as the SIM card shown in FIGS. 3a and 3b. From the application module connection unit 6 to the central processing unit of the mobile station 1 (MCU), there is an application module bus 14, by means of which the application modules 19 connected to the application module connection unit 6 communicate with the MCU. The AT commands, known e.g. from modems, can be used for the transfer of data and commands. The AT commands have been described in more detail e.g. in the Master of Science Thesis of Petri Heinonen, "Proposal for Standard AT Commands Used with GSM Mobile Equipment", 1994, Tampere University of Technology.

In addition to the application module bus 14, there is a separate control and data line I/O, I/O', I/O" (FIG. 2) from each application module connector 15, 16, 17, of the application module connection unit 6. Thus it is possible to use a structure based on the standard series ISO 7816 in the control and data line. The standard series ISO 7816 includes the voltage levels and timing diagrams, according to which the application modules 19 (FIG. 3c) are connected to the control and data line I/O, I/O', I/O".

For each application module 19, the application module connecting unit 6 has a connector, through which the application module bus 14 is led to the application module 19.

Figure 3C:
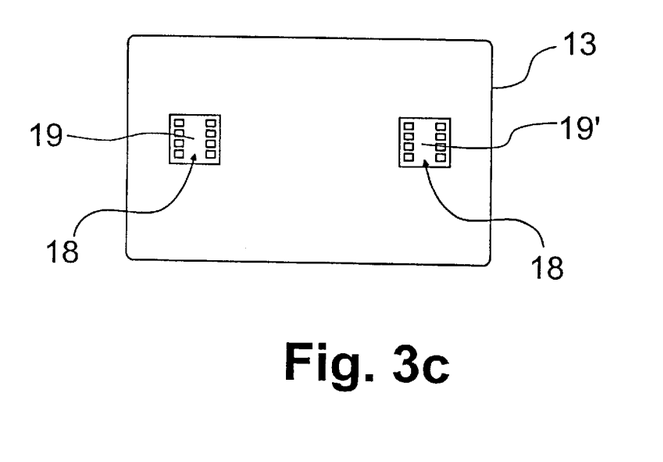
FIG. 3c shows a module card to which two application modules are connected.

More than one application modules 19 can be connected to the same module card 13, as shown in FIG. 3c. The second application module 19' on the module card 13 can be a SIM module, for example.

Figure 7:
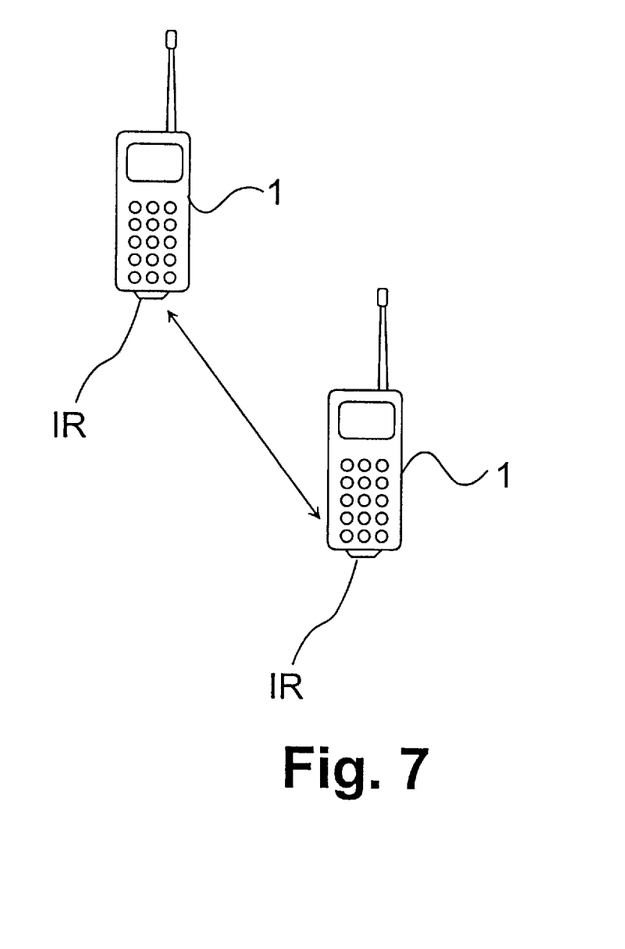
FIG. 7 shows the communication between two mobile stations in accordance with the invention.

The mobile station 1 also comprises a first means of data transfer, such as an infra red IR transmitter/receiver. The first means of IR data transfer can be used to transfer data, with relatively short distances, between the mobile station 1 and a cash register (payment terminal) 21 or, e.g., between two different mobile stations 1 (FIG. 7).

The first means of data transfer IR may also include a data connector 20, which can be used to connect a computer to the mobile station 1 (FIG. 1).

Figure 4A:
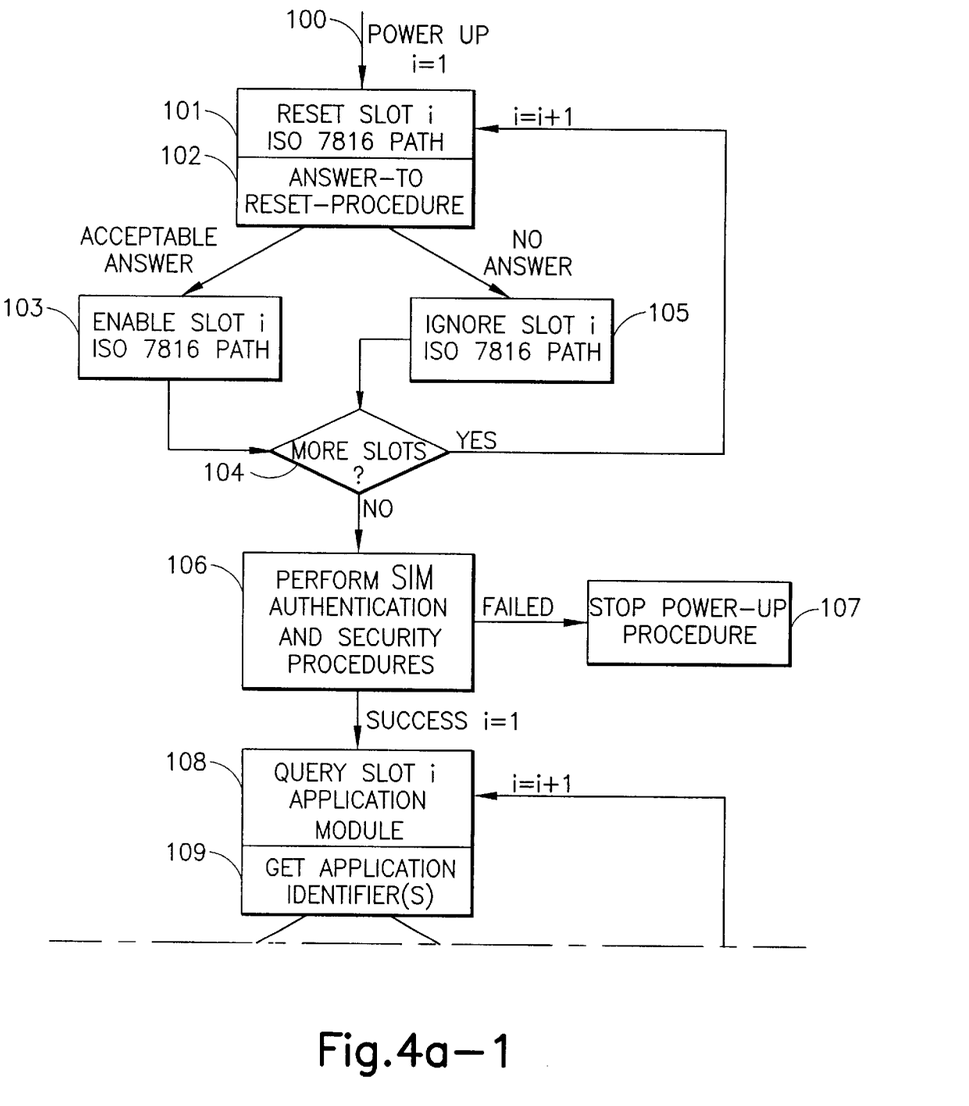
FIGS. 4a and 4b show the switching of the application from the first mode of operation to the second mode of operation as a flowchart.
Figure 4A:
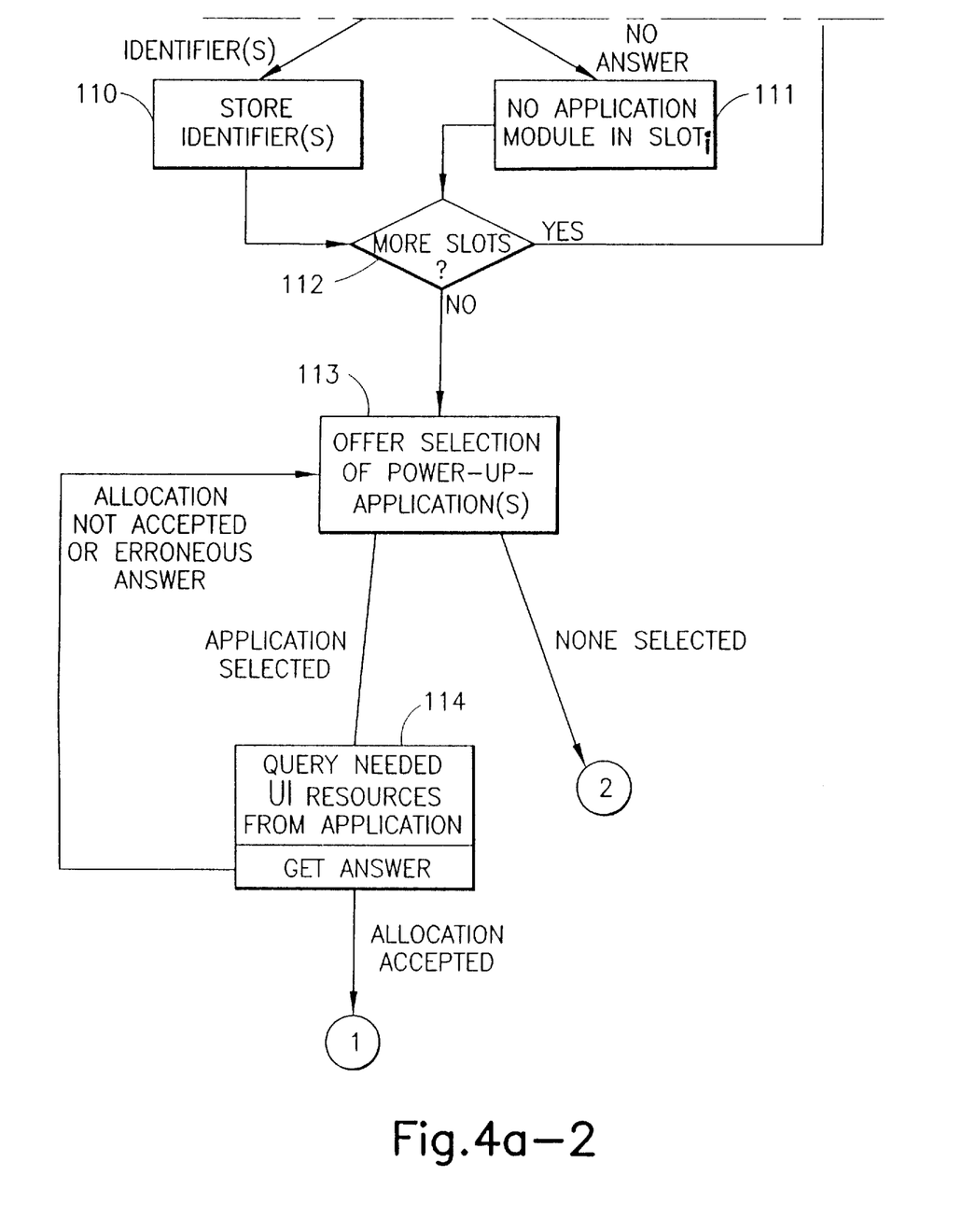
Figure 4B:
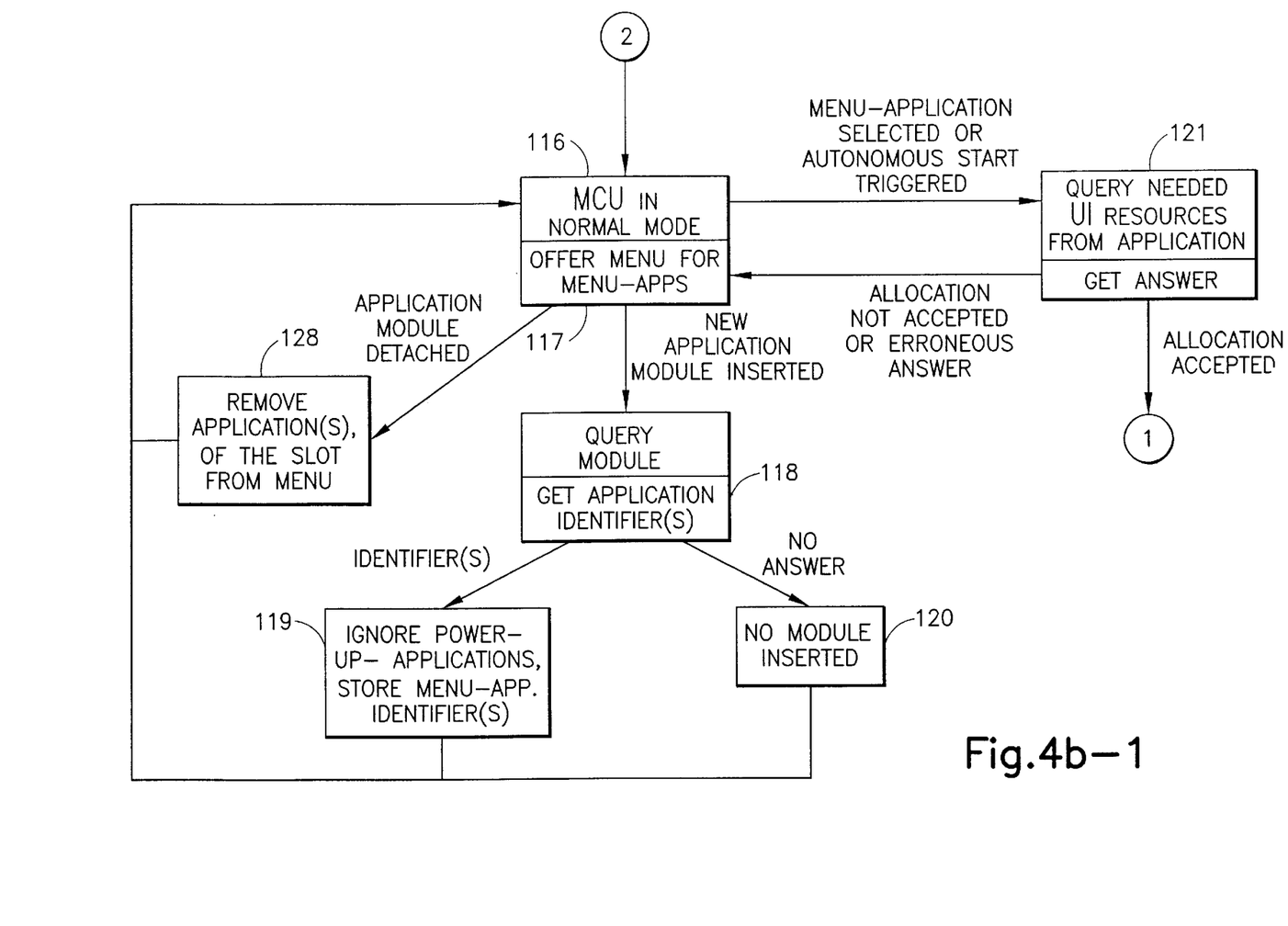
Figure 4B:
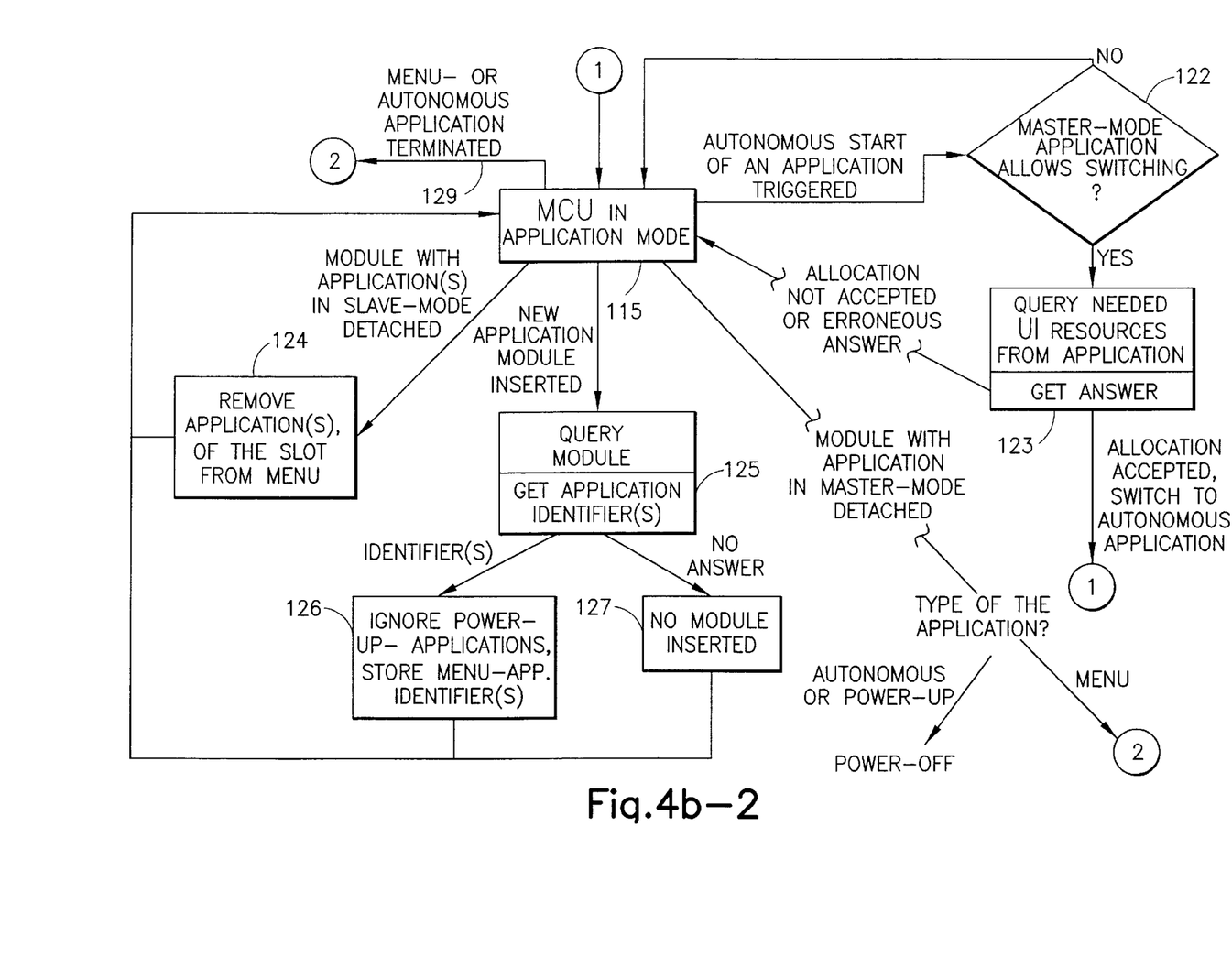

FIGS. 4a and 4b show how the application 18 is activated and inactivated, and how the application 18 is switched from the first mode of operation to the second mode of operation and vice versa. In this patent application, the first mode of operation means a mode in which the application does not do anything actively, but gets instructions through an application in the second mode of operation or through the MCU. The second mode of operation means a controlling mode, whereby an application in the second mode of operation can control the operation of various units of the mobile station 1, including the central unit MCU, and send messages to other applications.

The MCU can also have two different modes of operation: 1) normal mode and 2) application mode. In the normal mode, the central unit MCU operates like in a known mobile phone, controlling the operation of the mobile station. In the application mode, the MCU can be controlled by an application 18 (FIG. 3c), which is in the second mode of operation. Even in the application mode, the central unit MCU can read the keypad 8 and send information of keypad input to the application 18 in the second mode of operation, if the said application 18 requests it.

In the example shown in FIG. 4a, the procedure starts from the switching on (100) of the mobile station 1, whereafter the MCU of the mobile station 1 sets the control and data line I/O of the first application module connector 15 (FIGS. 1 and 2) to the reset status (block 101). If an application module 19 (FIG. 3c) has been connected to the first application module connector 15, and the said module 19 sends an acceptable ISO 7816 answer (block 102) to the MCU, the MCU sets the control and data line I/O of the first application module connector 15 to the allow status (block 103). In block 104 the MCU concludes whether all application module connectors 15, 16, 17, have been examined.

If all application module connectors 15, 16, 17 have not yet been examined, the procedure returns to block 101, in which the next application module connector 16, 17, is examined. If the MCU gets no response in block 102, or if the reply is not acceptable, the procedure continues in block 105, in which the MCU concludes that an ISO 7816 based application module 19 has not been attached to the application module connector 15, 16, 17.

When all application module connectors 15, 16, 17 have been examined, the procedure continues in block 106, in which the user identification, which is a known operation e.g. from a GSM network, is performed. If the user identification fails, the power-up procedure of the mobile station 1 is stopped (block 107). The user has generally three opportunities to give his/her own personal identification number. If the identification number is not given right at the third time, the user must give a longer identification code, after which the user has again three opportunities to give his/her own personal identification number right. If the user does not give the right identification number at any of these three extra opportunities, either, the user must give the longer and shorter identification code again. If the identification number is not given right after the allowed number of attempts, the control card destroys the information contained in it, whereby the control card SIM is permanently disabled.

When the personal identification number has been given successfully, the MCU moves to block 108, in which the MCU queries the information of applications 18 contained in the application module 19 connected to the first application module connector 15. If the application module 19 contains applications 18, the MCU reads the information of applications 18 (block 109) and saves them to its memory (block 110). If the examined application module 19 does not have applications 18, or there is no application module in the connector, the MCU saves this information in its memory (block 111). In block 112 the MCU concludes whether all application modules 19 have been examined. If there are still application modules 19, which have not been examined, the procedure returns to block 108, which queries the information of applications 18 contained in the next application module 19.

When the MCU has examined all application modules 19, the procedure continues after block 112 in block 113, in which the MCU prints a menu on the display 7 of the mobile station 1, and the user can select from the menu the application 18, which is to be switched to the second mode of operation, to control the MCU. If the user selects an application 18, the MCU asks which parts of the user interface UI are required by the application 18, such as the display 7, the keypad 8 and/or the status indicators 23. If the MCU does not get an acceptable answer from the selected application 18, the procedure returns to block 113. Whereas if the MCU gets an acceptable answer from the selected application 18, the MCU switches to the application mode, i.e. to be controlled by the selected application 18 (block 115).

If the user does not select an application 18 (block 113), the MCU switches to the normal mode (block 116), in which no application 18 controls the MCU, but all applications 18 are in the first mode of operation.

In the normal mode, block 117, the MCU can print a menu on the display 7 of the mobile station 1, a menu which contains the applications 18 available in the application modules 19. From the menu, the user can select the application which is to be switched to the second mode of operation (block 118). If the module card 13 is detached from the module card connector, all applications 18 in the detached module card 13 will be removed from the menu of the mobile station 1 (block 128).

In block 118, the situation, where the MCU queries the applications 18 contained in the selected application module 19, is described. If the MCU gets an acceptable answer from the application module 19, the MCU ignores power-up-type applications 18, but saves information of other applications (block 119). If the MCU does not get an acceptable answer from the application 18, no new applications 18 will be added (block 120).

If the MCU is in the normal mode of operation in block 116, and the user selects an application 18 from a menu, or an application 18 of an automatic type informs the MCU that it is switching to the second mode of operation, the MCU will ask which units of the user interface UI of the mobile station 1 the application 18, switching to the second mode of operation, will need (block 121). If the MCU does not get an acceptable answer from the application 18, the operation of the MCU will move to block 117. If the application 18 gives an acceptable answer to the MCU, the MCU will switch to the application mode (block 115).

When the MCU is in the application mode (block 115), and the precondition for an application 18 of the automatic type to switch to the second mode of operation is satisfied, that moment the application 18 in the second mode of operation is queried whether the application of an automatic type can switch to the second mode of operation (block 122). If switching is not allowed, the procedure returns to block 115. If switching is possible, the MCU asks the application of an automatic type 18 which units of the user interface UI of the mobile station 1 it needs (block 123). If the answer is not acceptable, the operation of the MCU returns to block 115 again. When the answer is acceptable, the application 18 of an automatic type switches to the second mode of operation to control the operation of the MCU, and at the same time the application 18, which was in the second mode of operation, switches to the first mode of operation.

If the module card 13, containing application modules 19, the applications 18 of which are in the first mode of operation, is removed from the module card connector, the said applications 18 will be removed from the menu.

If a new module card 13 is added to the mobile station 1, the identifying parameters of applications 18 of application modules 19 in the module card 13 are queried in block 125. If the application module 19 sends the identifiers to the MCU, the MCU rejects power-up-type applications 18 and saves the other applications 18 contained in the application module 19 in block 126. If no acceptable answer is received from the application module 19, the information of the application module will not be added (block 127).

If a module card 13 is removed from the module card connector, the said card 13 containing a power-up or automatic type of application 18, which is the second mode of operation, the mobile station 1 is switched off. Otherwise the MCU returns to the normal mode (block 116). An application 18 of the menu or automatic type being in the second mode of operation can also return automatically or be returned manually by the user to the first mode of operation (129).

Figure 6:
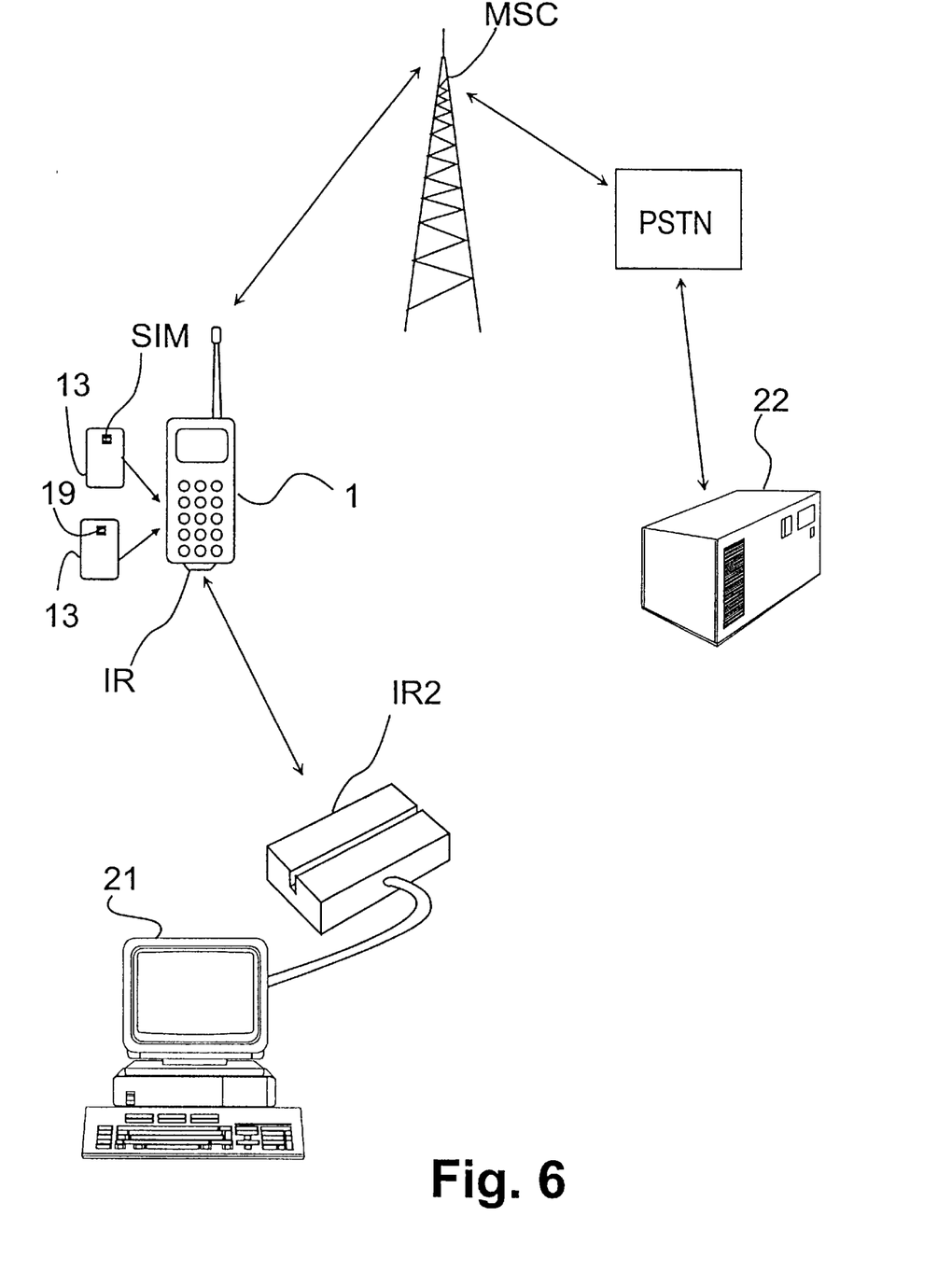
FIG. 6 shows the use of a method in accordance with the invention in connection with a cash card or payment card application.

In the following, the operation of a cash card or other payment card application in a mobile station 1 representing an embodiment of this invention will be described in principle (FIG. 6).

The mobile station 1 has both the control card SIM and one application module 19 connected to it, and the said module 19 contains an application 18 (not shown in FIG. 6), which in this example is a cash card application. The application 18 has at least one account corresponding to the user's bank account, whereby the user can make payments from the account in the application 18. Preferably, when the application 18 has been brought into use, the balance information has been read from the bank account, e.g. using the normal data channel of the GSM network or as a SMS message, and saved to the data memory EEPROM, which is part of the application module 19 and is used by the application 18.

In connection with the payment, the application 18 reduces the balance of the account in the application 18 accordingly. The updating of payment transactions etc. in the application 18 to the user's bank account can take place preferably automatically, controlled by the application 18, e.g. at a certain time, and/or as selected by the user from a menu of the mobile station 1, and/or in connection with the payment. When the bank account is updated, the application 18 guides the MCU to establish a connection for data transfer through a Mobile Services Switching Center MSC, and most often through some private wired network, to the computer 22 in the bank. Establishing the connection can take place either by asking the user for the telephone number first, or by using a number saved in the memory of the application, which makes the procedure easier. Preferably, if SMS messages are used to update the balance information, the normal speech/data channel is free for other activities.

In the mobile station 1, the user can have many different accounts at the same time, such as a bank account, a credit account and/or a cash account, and they can be in different applications 18, even in different application modules 19. An advantage of this method is, among other things, the fact that the user can transfer money between the accounts, e.g. from a credit account to a bank account or cash account.

The application 18 can be brought into use e.g. after the mobile station 1 has been switched on, as is shown in the flowchart of FIGS. 4a and 4b. The MCU prints a message to the display 7 for entering the identification number. The user enters his/her own identification number, which is read by the MCU and transmitted to the SIM card. The central processing unit CPU in the SIM examines the entered identification number by comparing it to the previously saved identification number and informs the MCU whether the identification number has been given right. If the identification number was not right, the MCU can ask the user to give it again.

If the identification number has been given right, the MCU operates in accordance with the phases described above. Because there are no other application modules 19 in the other connectors 16, 17, in this embodiment, the MCU prints a menu to the display 7, from which the user can select an application 18 of the application module 19, which application is a cash card application, whereafter the application 18 switches to the second mode of operation, and the MCU switches to the application mode.

Ordinary phone calls can be made with the mobile station 1. All the other functions of the mobile station 1 are also available. The essential difference is that when the user enters a telephone number from the keypad 8, the MCU transmits the key press information to an application in the second mode of operation, which guides the MCU to establish a connection.

If a user wants to inquire the balance of his/her bank account, he/she will first select the menu function using the keypad 8, whereby the MCU transmits the key press information to the application 18. The application 18 guides the MCU to print a menu to the display 7, from which the user can select a balance query. After the user has selected a balance query from the menu, the MCU transmits the key press to the application 18, which examines it and sends a message to the MCU, which then prints a text on the display 7, telling the user that the mobile station 1 is performing a balance query. Next the application retrieves the balance saved in the data memory EEPROM of the application module and forms a message by which the MCU prints the balance on the display 7.

The following is an example of the implementation of the aforementioned balance query using AT commands:

| | |
|---|---|
| Event code: | +CKEV: 91,1 (choose menu) |
| AT command: | AT+CDIS="NOKSET", "View"","menuv"," "," ","Quit" (update display) |
| AT command: | AT+CIND=,,,,11,11 (update indicators) |
| Event code: | +CKEV: 91,0 |
| Event code: | +CKEV: 49,1 (choose menu number 1 . . .) |
| AT command: | AT+CIND=,,,,11,1 |
| Event code: | +CKEV: 49,0 |
| Event code: | +CKEV: 53,1 ( . . . number 15) |
| AT command: | AT+CIND=,,,,1,5 |
| Event code: | +CKEV: 53,0 |
| AT command: | AT+CDIS="NOKSET","Amount of","balance"," ", "OK","Quit" (display menu 15) |
| AT command: | AT+CIND=,,,,0,0 |
| Event code: | +CKEV:91,1 (choose "OK") |
| AT command: | AT+CDIS="NOKSET","Requesting . . . "," "," "," ", "Quit" |
| Event code: | +CKEV:91,0 |
| AT command: | AT+CMGS="12345678"Request amount of balance message^Z (send short message) |
| Event code: | +CMT TEXT: "12345678",12 (receive result) 125232,69 mk 0,0,0,,94102610100058,8, |
| AT command: | AT+CDIS="NOKSET","You have","125232,69 mk", " "," ","Quit" (display result) |

In the previous example, the balance inquiry was done from the memory of the application module in the mobile station. Typical for these account based applications is the need of data transfer between the mobile station and the bank. If that data transfer fails, for some reason, it may be necessary to do the balance inquiry or update "manually" from the bank. If the user selects direct balance inquiry, using e.g. a menu, the mobile station transmits a balance inquiry to the bank using e.g. short message service SMS, if available. In the message there is the current balance of the account in the application, from the application module's memory, included. Therefore, when the bank returns the updated balance, preferably both the changes in the application module's and bank's accounts can be taken into account.

Payments from the account can also be made easily by entering the appropriate information from the keypad 8 of the mobile station 1.

The following is a description of one exemplary embodiment of the invention, in which the application 18 is a cash application, by which payments can be made e.g. in shops or buses.

The application 18 is identified as shown in the previous example. When the application 18 has switched to the second mode of operation, the user can establish a connection with the mobile station 1 to the computer 22 in the bank, and transfer money from his/her account to the cash application. In practice, the transfer takes place electronically, whereby the balance of the cash card increases and the balance of the bank account decreases. The user performs internal bank transfers with the mobile station 1 from the bank account of the payment application to the cash application or vice versa. Internal bank transfers require that the information on the transfers must be updated to the computer 22 in the bank.

For making the payment, the user enters a certain code, by which he/she informs the application 18 that he/she wants to pay for the shopping. After this, the application establishes a connection through the MCU to the first means for data transfer IR, such as an IR transmitter/receiver or the like. Second means of data transfer are arranged in the cash register 21 or the like in the shop, through which means the application 18 and the EPOS (Electronic Point of Sale) terminal application of the cash register can have a mutual connection for data transfer.

When the connection has been established, the user enters the identification number of the cash card, and the cash card application compares it to the previously saved identification number. If the identification number has been given right, and the application 18 has sufficient balance, the payment transaction is registered both in the cash register 21 and the application 18 of the mobile station 1, whereby the balance on the cash card is decreased correspondingly. The updating of the payment transaction to the computer 22 can take place either from an EPOS application or from the application 18 of the mobile station 1.

In IR data transfer, it is preferable to use a known standard, such as the protocol stack defined by IrDA (Infrared Data Association), which is based on the OSI (Open Systems Interconnection) model of ISO. The protocol stack uses the layers of the OSI model: 1) physical layer, 2) data link layer, 3) network layer and 7) application layer.

On the physical layer, data transfer can be based on infrared, but other known methods of data transfer, such as ultrasound, electromagnetic induction or radio waves, can also be used.

Data transfer is secured in the data link layer, e.g. by error correction algorithms. In addition, the functions of the data link layer are used for identifying the means for data transfer in situations in which many means of data transfer can be operating simultaneously, e.g. in shops where there are many EPOS applications.

In the network layer, the messages going through the means for data transfer can be distributed to the receivers regardless of the number of means for data transfer in operation. In addition, the information to be transmitted can be enciphered in the network layer, which is particularly important in payment applications.

The application 18 is capable of data transfer through the application layer, in which the application 18 sends and receives information needed for data transfer through the MCU preferably to the first means for data transfer, IR, or to the radio communication network.

Correspondingly, the other piece of equipment participating in the data transfer, such as the cash register 21 (FIG. 6), has an EPOS terminal application, which handles messages it has received through other means of data transfer IR2, in accordance with the layer structure described above.

Figure 5:
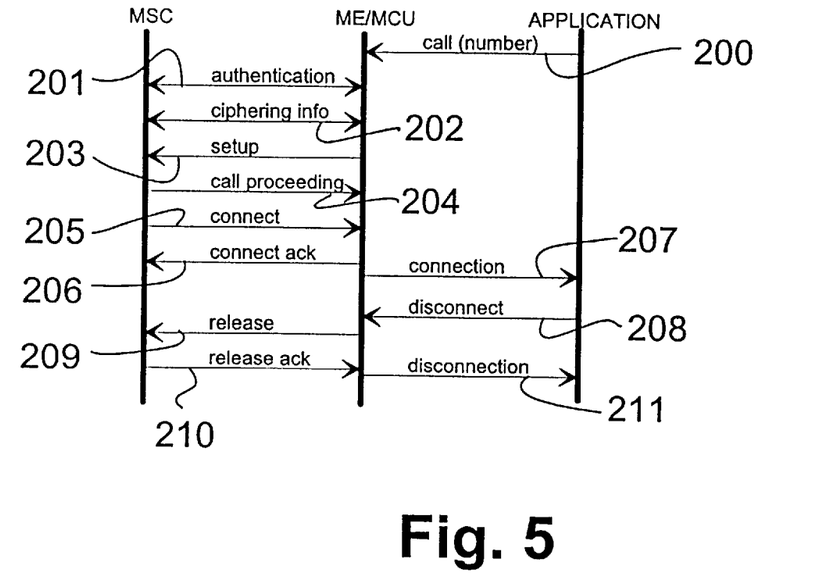
FIG. 5 shows the path of the telephone call between the application and a mobile services switching center (MSC) in a mobile radio communication network as a simplified diagram.

FIG. 5 shows a simplified diagram of a telephone call between the APPLICATION and the Mobile Services Switching Center MSC, which is part of a mobile services network. At step 200, the application sends the telephone number to be called to the MCU of the mobile station 1, which sends to the Mobile Switching Center MSC the identification data and other data needed for establishing a connection (steps 201, 202 and 203). The switching center MSC transmits information of the progress of the call (step 204) and the state of the connection (step 205) to the mobile station 1, after which the mobile station 1 sends acknowledgment of connection to the MSC (step 206) and to the application 18 (step 207). For closing the connection, the application 18 sends a close connection command to the MCU of the mobile station 1 (step 208), which sends a close connection request to the Mobile Services Switching Center (step 209). The MSC sends a connection closed acknowledgment to the MCU of the mobile station 1 (step 210). Finally, the MCU of the mobile station 1 sends to the application 18 information of the closing of the connection (step 211).

In the previous exemplary embodiment of the invention the money was stored in an account, finally located in a money server in a bank. Therefore it was necessary to update the balance in the mobile station and in the bank. In another embodiment of this invention the electric money is stored to the mobile station itself. When that kind of electric money (also referred as "Digital Cash") is used, e.g. for paying parking fees or phone bills, the corresponding amount of money is cut down from the electric money purse of the mobile station. The "Digital Cash" can be stored e.g. as a code word in mobile stations memory. No link between the payment terminal 21 (FIG. 6) and the money server 22 is required at the moment when the payment is made When the "Digital Cash" has run out or more is needed, the electric money purse of the mobile station needs reloading. There are several methods to do that. One method, close to the approach with real money and ATM (Automatic Teller Machine) machines, would be to walk to the nearest "Digital Cash ATM" to download more money from the account. This is not very handy, because it will take some time before these kind of "Digital Cash ATM" machines are widely available. The present invention offers a much more convenient way to do the reloading of "Digital Cash".

Using the SMS service, it is possible to download more "Digital Cash" from the bank account to the mobile station, using a method close to the one described in the previous embodiment of the invention concerning balance inquiry. The mobile station sends a request to send more "Digital Cash", e.g. as a SMS message, to the money server responsible for the user's account. As a response, suppose the account has balance, the money server sends "Digital Cash" to the mobile station, where it is stored to the memory.

The network, where the mobile station in accordance with the invention is used is not limited to GSM only, GSM is a good example of a system that offers required data transfer possibilities. Particularly the SMS messages available in GSM network are handy, because the normal phone/data channel is not effected when transferring SMS messages.

In addition to payment applications, the method of the invention can also be used for other kinds of applications. For example gathering and presenting other information, such as timetables, stock prices, exchange rates, etc. Each of the previous examples can be implemented in a separate application module, or the wanted functions and applications can be combined to a multi-functional application module for the mobile station.

FIG. 7 shows an application in which two mobile stations 1 do communicate with each other by means of the first means of data transfer IR. It is possible to transfer e.g. data and/or speech. Preferably the first means of data transfer IR makes it possible to connect the mobile station 1 also e.g. to a movable PC which has the corresponding means for data transfer IR or to a wireless LAN (Local Area Network).

The method of the invention provides a flexible means for increasing the usability of the mobile station 1. A mobile station 1 in accordance with the invention can make use of various services from suppliers who produce and sell applications 18. For credit card companies, a method like this is one way of reducing misuse of credit cards.

The invention is not limited to the above described exemplary embodiments only, but its details can be modified without departing from the scope defined by the attached claims.

We claim:

1. A method for using an application in a mobile station for wireless communication, the mobile station comprising a master control unit (MCU) for implementing mobile station functions, the mobile station further comprising wireless communication means for providing wireless communication, wherein the application has a first mode of operation and a second mode of operation, whereby the first mode of operation is passive and in the second mode of operation the application controls the MCU, wherein the MCU of the mobile station has a normal operating mode, during which the MCU performs control operations, and an application operating mode during which the MCU is controlled by the application, and wherein the MCU controls switching of the MCU between the normal operating mode and the application operating mode.

2. A method in accordance with claim 1, wherein the application is a cash card application.

3. A method in accordance with claim 1, wherein the application is a payment card application.

4. A method in accordance with claim 1, wherein the application is a credit card application.

5. A method in accordance with claim 1, wherein while the application is in the second mode of operation, the mobile station communicates with another mobile station using a first means of data transfer.

6. A method in accordance with claim 1, wherein the MCU is controlled using AT commands.

7. A method in accordance with claim 1, wherein the application includes one of a power-up-type application, a menu type application, and an automatic type application.

8. A method as set forth in claim 1, wherein while the application is operating in the second mode of operation and the MCU is operating in the application operating mode, the application controls the MCU in accordance with command information communicated by the application to the MCU.

9. A method as set forth in claim 1, wherein the application is incorporated in an external application module that is attachably coupled to the MCU.

10. A method as set forth in claim 9, wherein there is also at least one of a SIM card and another external application module coupled to the MCU.

11. A method as set forth in claim 9, wherein the external application module includes a plurality of separate applications.

12. A method as set forth in claim 1, wherein the application is included in a SIM module.

13. A method as set forth in claim 1, wherein the application is incorporated in one of a plurality of external application modules that are coupled to the MCU, wherein while the application is operating in the first mode of operation, the application provides messages to at least one other application included in at least one of the plurality of external application modules, and controls at least one operational component of the mobile station.

14. A method as set forth in claim 1, wherein while the application is operating in the second mode of operation and the MCU is operating in the application operating mode, further steps are performed of:

providing data from the application to the MCU; and in response to the MCU receiving the data from the application, the MCU controlling a transmitting means of the mobile station so as to transmit the data from the mobile station to at least one of an external local receiver and an external communications network.

15. A method as set forth in claim 1, wherein the application includes at least one of a timetable information application, an exchange rate information application, and a stock information application.

16. A method as set forth in claim 1, wherein the mobile station includes an input user interface that is coupled to the MCU, and wherein while the MCU is operating in the application operating mode and the application is operating in the second mode of operation, further steps are performed of:

a user operating the input user interface for inputting information into the MCU; and the MCU forwarding the information to the application in response to an occurrence of one of the operating step and the MCU receiving a request for the information from the application.

17. A method as set forth in claim 1, wherein while the MCU is operating in the application operating mode and the application is operating in the second mode of operation, a further step is performed of the application controlling the MCU for establishing a data transfer connection with a receiving station.

18. A method as set forth in claim 1, wherein the mobile station includes an input user interface coupled to the MCU and a display device coupled to the MCU, and wherein while the MCU is operating in the application operating mode and the application is operating in the second mode of operation, further steps are performed of:

a user operating the input user interface for inputting information into the MCU specifying that a particular menu function be entered;

receiving t he inputted information at the MCU;

wherein when the MCU receives the inputted information, forwarding the inputted information from the MCU to the application; and wherein when the application receives the inputted information from the MCU, the application performs a step of commanding the MCU to present a menu-related message to the user via the display.

19. A method as set forth in claim 1, wherein the mobile station includes an input user interface coupled to the MCU, a memory coupled to the MCU, and an output user interface coupled to the MCU, and wherein while the MCU is operating in the application operating mode and the application is operating in the second mode of operation, further steps are performed of:

a user operating the input user interface for inputting information into the MCU requesting that status information stored in the memory be provided to the user, the status information relating to a user account;

receiving the inputted information at the MCU;

wherein when the MCU receives the inputted information, forwarding the inputted information from the MCU to the application; and wherein when the application receives the inputted information from the MCU, the application performs steps of:

retrieving the status information from the memory; and commanding the MCU to control the output user interface so as to present the status information to the user as a text message.

20. A method as set forth in claim 1, wherein the mobile station includes an input user interface that is coupled to the MCU and a transmitter that is coupled to the MCU, and wherein while the MCU is operating in the application operating mode and the application is operating in the second mode of operation, further steps are performed of:

a user operating the input user interface for inputting information into the MCU;

receiving the inputted information at the MCU;

wherein when the MCU receives the inputted information, forwarding the inputted information from the MCU to the application; and wherein when the application receives the inputted information from the MCU, the application performs a step of commanding the MCU to control the transmitter so as to transmit a Short Message Service (SMS) message to a receiving destination.

21. A mobile station which has means for using an application, wherein the mobile station also comprises:

a master control unit (MCU) coupled to said application, said MCU normally operating in a first, master control state for controlling operations of the mobile station, said MCU being switchable for operating in a second, slave state;

means for setting the application in a first mode of operation; and means for setting the application in a second mode of operation;

wherein said MCU controls the switching of said MCU from said first, master control state to said second, slave state upon said application being set in said second mode of operation, and wherein in the second, slave state said MCU operates under the control of said application.

22. A mobile station in accordance with claim 21, wherein the mobile station also comprises means for providing infrared data transfer.

23. A mobile station in accordance with claim 21, wherein the mobile station also comprises means for connecting the mobile station to a computer.

24. A mobile station in accordance with claim 21, wherein the mobile station is a GSM mobile phone.

25. A mobile station in accordance with claim 21, wherein said application includes means for controlling said MCU while said application is operating in said second mode of operation and said MCU is operating in said second, slave state.

26. A method for operating a user terminal, the method comprising the steps of:

providing the user terminal with a controller, the controller normally operating in a first, master control state, the controller being switchable for operating in a second, slave state, wherein in the first, master control state, the controller operates as a master controller for controlling operations of the user terminal;

coupling at least one external application module to the MCU, the at least one external application module including at least one application that normally resides in a first, passive mode, the at least one application being controllable for operating in a second, active mode;

activating the at least one application so as to cause the at least one application to operate in the second, active mode; and in response to the activating step, switching the operation of the controller from the first, master control state to the second, slave state, wherein in the second, slave state the controller operates under the control of the at least one application.

27. A method as set forth in claim 26, wherein the step of activating is performed in response to the user terminal being powered on.

28. A method as set forth in claim 26, wherein the step of activating is performed in response to the performance of the coupling step.

29. A method as set forth in claim 26, wherein the step of activating is performed in response to an occurrence of a predefined event.

30. A method as set forth in claim 29, wherein the predefined event includes a receipt by the user terminal of a message.

31. A method as set forth in claim 26, wherein the step of activating is performed in response to a user of the user terminal entering information into the user terminal specifying that the at least one application operate in the second, active mode.

32. A method as set forth in claim 26, wherein the at least one application includes a cash card application.

33. A method as set forth in claim 26, wherein the at least one application includes a payment card application.

34. A method as set forth in claim 26, wherein the at least one application includes a credit card application.

35. A method as set forth in claim 26, wherein the at least one external application module is a SIM module.

36. A method as set forth in claim 26, wherein the user terminal includes a plurality of user interface components, and wherein prior to the performance of the switching step, steps are performed of:

the MCU querying the at least one application for obtaining information specifying which ones of the user interface components are required by the at least one application; and in response to both the activating step and the MCU receiving the information from the at least one application, performing the step of switching.

37. A method as set forth in claim 26, wherein prior to the performance of the activating step, steps are performed of:

performing an operation for determining whether or not a user of the user terminal is authorized to operate the user terminal; and in response to determining that the user is authorized to operate the user terminal, performing the activating step.

38. A method as set forth in claim 26, wherein information indicating a balance of a user account is stored in an external storage device, and wherein further steps are performed of:

a user entering information into the user terminal requesting that the information indicating the balance of the user account be retrieved from the external storage device;

in response to the user terminal receiving the userentered information, communicating a message from the user terminal to the external storage device requesting that the information indicating the balance of the user account be provided to the user terminal; and providing the information indicating the balance of the user account from the external storage device to the user terminal.

39. A method as set forth in claim 26, wherein the at least one application relates to a first user account having a first balance, wherein an external storage location stores a second user account having a second balance, and wherein further steps are performed of:

the user terminal communicating with the external storage location so as to transfer at least a portion of the first balance to the second user account stored in the external storage location; and decreasing the first balance by an amount that is equal to the portion of first balance transferred to the second user account.

40. A method as set forth in claim 26, wherein the at least one application relates to a first user account having a first balance, wherein an external storage location stores a second user account having a second balance, and wherein further steps are performed of:

the user terminal communicating with the external storage location so as to retrieve at least a portion of the second balance from the second user account stored in the external storage location; and increasing the first balance by an amount that is equal to the portion of second balance retrieved from the second user account stored in the external storage location.

41. A method as set forth in claim 26, wherein the at least one application includes a cash card application having an account balance, and wherein further steps are performed of:

a user entering information into the user terminal specifying that a payment be made from the account balance to an external terminal; and in response to the performance of the entering step, the user terminal communicating with the external terminal so as to effect a payment transaction with the external terminal.

42. A method as set forth in claim 41, and further comprising a step of decreasing the account balance by an amount of said payment transaction.

43. A method as set forth in claim 41, wherein the step of communicating is performed through at least one of an IR communication link, an ultrasound communication link, an electromagnetic link, and a radio link.

44. A method as set forth in claim 26, and further comprising the steps of:

the at least one application forwarding telephone number information to the MCU; and in response to the MCU receiving the telephone number information, establishing a call from the user terminal to a destination.

45. A control device, comprising:

a controller;

a memory that is bidirectionally coupled to the controller, said memory storing an operating program for the control device; and means, coupled to said controller, for coupling said controller to a master control unit (MCU) of an external user terminal, said controller operating under the control of the operating program stored in said memory, said operating program having a first, passive mode and a second, active operating mode, said MCU being controllable by said MCU for switching from a first, master control state to a second, slave state upon said operating program switching from said first, passive mode to said second, active operating mode, wherein in the first, master control state, the MCU controls operating functions of the user terminal, and in the second, slave state the MCU operates under the control of said controller for controlling the operating functions of said external user terminal.

46. A control device as set forth in claim 45, wherein the operating program relates to a plurality of separate applications.

47. A control device as set forth in claim 45, wherein the control device is a SIM module.

48. A control device as set forth in claim 45, wherein the operating program relates to a cash card application.

49. A control device as set forth in claim 45, wherein the operating program relates to a payment card application.

50. A control device as set forth in claim 45, wherein the operating program relates to a credit card application.

* * * * *